LE ROY E. DRIVER.
PLOW CLEANING ATTACHMENT.
APPLICATION FILED MAY 3, 1917.
1,268,823.
Patented June 11, 1918.
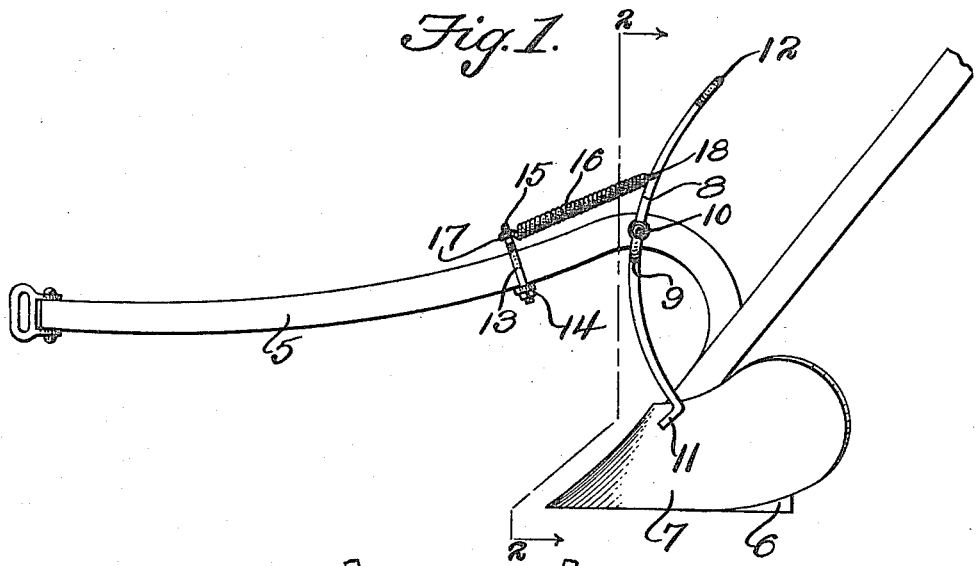
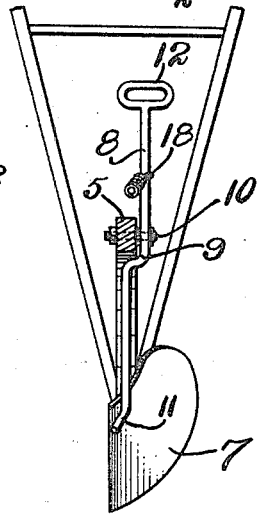
WITNESSES
INVENTOR
Le Roy E. Driver
BY
ATTORNEY

UNITED STATES PATENT OFFICE.

LE ROY E. DRIVER, OF DUMONT, TEXAS.

PLOW-CLEANING ATTACHMENT.

1,268,823.    Specification of Letters Patent.    Patented June 11, 1918.

Application filed May 3, 1917. Serial No. 166,260.

*To all whom it may concern:*

Be it known that I, LE ROY E. DRIVER, a citizen of the United States, residing at Dumont, in the county of King and State of Texas, have invented certain new and useful Improvements in Plow-Cleaning Attachments, of which the following is a specification.

My invention relates to cleaning attachments for plows.

The principal object of the present invention is to provide a cleaning device or attachment for plows or cultivator blades which is mounted adjacent the same so that the device may be readily manipulated to remove grass, weeds, and other matter that has been caught by the plow or cultivator.

A further object of the invention is to provide a cleaning attachment of this character which is mounted adjacent the plow or cultivator blade and which when operated to disengage the grass, etc., from the plow or cultivator blade, will be automatically returned to its normal position.

Another object resides in the provision of a plow attachment of the above mentioned character which may be mounted upon and used in conjunction with any conventional earth working implement without materially rearranging the parts thereof.

It is another general object of my invention to provide a cleaning device for plows or the like which consists of few simple elements which may be easily assembled and disassembled and which are not likely to become inoperative; and which may be manufactured and sold at a minimum cost.

The above general objects together with others will be discussed in the following description and the inventive features explicitly defined in the appended claim.

The invention consists of details of construction, combinations, and arrangements of parts which will be hereinafter specifically set forth and illustrated in the accompanying drawing in which:

Figure 1 is a side elevation of a plow having my improved cleaning device mounted thereon, and Fig. 2 is a view taken on line 2—2 of Fig. 1, and looking in the direction of the arrow.

Referring more particularly to the drawing, the numeral 5 designates a plow beam while the numeral 6 designates the usual plow that includes the usual mold-board 7.

My improved device consists of a lever 8 which is formed in this instance from a length of rod. This lever 8 is longitudinally disposed and is bent inwardly as at 9 so that the lower end of the rod is off-set from the upper end. Extending through the lever just above the bend 9 is a pivot pin 10 that is secured to the plow beam 5. The lower end of the rod is formed with a cleaning element 11. This cleaning element 11 lies against the mold-board 7 and normally extends in a plane which is substantially parallel with the forward or cutting edge of the plow. A handle 12 is formed upon the upper end of the rod 8 which is within the reach of the plowman.

Mounted on the beam 5 forwardly of the rod 8, is a U-shaped yoke 13 which is retained into position on the plow beam by nuts 14. A securing member 15 is formed upon the upper or horizontal bar of the U-shaped yoke 13.

A coil spring 16 has one end secured to this securing member 15 as at 17 while its opposite end is connected with the lever 8 as at 18. The function of this coil spring 16 is to normally retain the rod 8 in a position where the cleaning element 11 will contact with the mold-board as is clearly shown in the drawing.

It will be manifest that in order to dislodge the grass, weeds, etc. from the plow, the handle 11 is simply grasped and moved rearwardly which will cause the cleaning element to move along the cutting edge of the plow and the adjacent part of the mold-board. Upon releasing the handle 12 the lever 8 will be returned to its normal position by the coil spring 16.

While I have illustrated my invention as applied to a plow, I wish to here state that it is applicable to other earth working implements, such as cultivators, and the like.

This disclosure is merely illustrative and I do not wish to be restricted to the exact details herein mentioned and illustrated, but it is to be understood that I may make such legitimate changes that may be fairly embodied in the scope of the appended claim.

What is claimed is:—

The combination with a plow, of an arcuate lever pivotally secured to the plow beam, the lower half of the lever being offset to extend downwardly beneath the beam and having its extremity bent to provide a cleaner adapted to lie against the moldboard, a handle formed on the upper end of the lever and extending above the plow beam, and a spring having one end secured to said beam and the opposite end secured to the lever adjacent said handle.

In testimony whereof I affix my signature in presence of two witnesses.

LE ROY E. DRIVER.

Witnesses:
W. H. ABERNATHY,
JNO. J. RICHARDS.

Copies of this patent may be obtained for five cents each, by addressing the "Commissioner of Patents, Washington, D. C."